(12) United States Patent
Xiao et al.

(10) Patent No.: US 11,671,128 B2
(45) Date of Patent: Jun. 6, 2023

(54) ANTENNA SYSTEM AND BASE STATION (71) Applicant: HUAWEI TECHNOLOGIES CO., LTD., Shenzhen (CN)

(72) Inventors: Weihong Xiao, Dongguan (CN); Zhiqiang Liao, Shenzhen (CN); Jianping Li, Shenzhen (CN); He Cui, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/171,038

(22) Filed: Feb. 9, 2021

(65) Prior Publication Data

US 2021/0167804 A1 Jun. 3, 2021

Related U.S. Application Data

(63) Continuation of application No. PCT/CN2019/099993, filed on Aug. 9, 2019.

(30) Foreign Application Priority Data

Aug. 14, 2018 (CN) .......................... 201810920634.7

(51) Int. Cl.
 *H04B 1/04* (2006.01)
 *H04B 1/7093* (2011.01)
 *H04L 5/14* (2006.01)

(52) U.S. Cl.
 CPC ......... *H04B 1/0475* (2013.01); *H04B 1/7093* (2013.01); *H04L 5/14* (2013.01); *H04B 2001/70935* (2013.01)

(58) Field of Classification Search
 CPC .......... H04B 1/0475; H04B 1/04; H04B 1/10; H04B 1/1018
 See application file for complete search history.

(56) References Cited

U.S. PATENT DOCUMENTS

| 6,658,269 B1* | 12/2003 | Golemon | H04W 52/42 375/267 |
| 2003/0092402 A1* | 5/2003 | Shapira | H04B 7/0615 455/500 |

(Continued)

FOREIGN PATENT DOCUMENTS

| CN | 104137327 A | 11/2014 |
| CN | 104269658 A | 1/2015 |

(Continued)

OTHER PUBLICATIONS

Chinese Office Action for Application 2018109206347 dated Sep. 27, 2020.

(Continued)

*Primary Examiner* — Kevin Kim (74) *Attorney, Agent, or Firm* — Rimon PC (57) ABSTRACT

This application provides an antenna system and a base station. The antenna system includes a radiation array, a transceiver (TRX) unit, and a filter bank. The radiation array includes a transmit antenna element group and a receive antenna element group that are separately disposed. The transmit antenna element group is configured to transmit a signal, and the receive antenna element group is configured to receive a signal. The TRX unit includes a transmit module and a receive module. The filter bank includes a first-type filter and a second-type filter. The first-type filter is connected between the transmit antenna element group and the transmit module, and the second-type filter is connected between the receive antenna element group and the receive module. The antenna system in this application can reduce interference between a passive intermodulation (PIM) signal generated by a transmitted signal and a received signal.

19 Claims, 8 Drawing Sheets

(56) References Cited

U.S. PATENT DOCUMENTS

| | | | |
|---|---|---|---|
| 2009/0135078 A1 | 5/2009 | Lindmark et al. | |
| 2014/0009357 A1 | 1/2014 | Tiezzi et al. | |
| 2014/0030979 A1* | 1/2014 | Bowman | H04B 15/00 |
| | | | 455/39 |
| 2014/0184457 A1* | 7/2014 | Lea | H01Q 9/285 |
| | | | 343/747 |
| 2015/0080039 A1* | 3/2015 | Ling | H04B 7/24 |
| | | | 455/500 |
| 2018/0145400 A1 | 5/2018 | Gabriel et al. | |
| 2018/0234120 A1* | 8/2018 | Gharavi | H04B 7/0408 |
| 2019/0166603 A1* | 5/2019 | Wang | H04B 7/0868 |

FOREIGN PATENT DOCUMENTS

| | | | | |
|---|---|---|---|---|
| CN | 107453053 A | 12/2017 | | |
| CN | 108232468 A | 6/2018 | | |
| DE | 102016112701 A1 | 1/2018 | | |
| GB | 2335572 A | 9/1999 | | |
| TW | 201737868 A | 11/2017 | | |
| WO | 9811626 A1 | 3/1998 | | |
| WO | WO-0239541 A2 * | 5/2002 | | H01Q 1/246 |
| WO | WO-2018053698 A1 * | 3/2018 | | H01Q 1/52 |
| WO | WO-2019053972 A1 * | 3/2019 | | H01P 1/20 |

OTHER PUBLICATIONS

International Search Report for Chinese Application 2018109206347 dated Sep. 8, 2018.

* cited by examiner

ANTENNA SYSTEM AND BASE STATION

CROSS-REFERENCE TO RELATED APPLICATIONS

This application is a continuation of International Application PCT/CN2019/099993, filed on Aug. 9, 2019, which claims priority to Chinese Patent Application No. 201810920634.7, filed on Aug. 14, 2018. The disclosures of the aforementioned applications are hereby incorporated by reference in their entireties.

TECHNICAL FIELD

This application relates to the field of communications technologies, and more specifically, to an antenna system and a base station.

BACKGROUND

With the rise of communications technologies, especially cellular network mobile communications technologies, a massive multi-input multi-output (massive MIMO for short) antenna system is widely applied.

In a conventional frequency division duplexing (FDD) multiple-input multiple-output antenna system, an antenna unit is connected to a transceiver (TRX) unit using a combiner. The combiner includes a filter for processing a transmitted signal and a filter for processing a received signal. The antenna unit may transmit a signal while receiving a signal, and a passive intermodulation (PIM) signal may be generated between transmitted signals in different frequency bands. The PIM signal causes interference with the received signal, resulting in deterioration of signal quality in the received signal.

Therefore, there is a need to design a new antenna system that can reduce interference between a PIM signal and a received signal. In this way, the quality of the received signal can be improved.

SUMMARY

This application provides an antenna system and a base station that are designed to reduce interference between a transmitted signal to a received signal.

According to a first aspect, an antenna system is provided. The antenna system includes a radiation array, a transceiver (TRX) unit, and a filter bank. The radiation array includes a transmit antenna element group and a receive antenna element group that are separately disposed, where the transmit antenna element group is configured to transmit a signal, and the receive antenna element group is configured to receive a signal. The TRX unit includes a transmit module and a receive module. The filter bank includes a first-type filter and a second-type filter, where the first-type filter is connected between the transmit antenna element group and the transmit module, and the second-type filter is connected between the receive antenna element group and the receive module.

It should be understood that, that the transmit antenna element group and the receive antenna element group are separately disposed in the radiation array means that the transmit antenna element group and the receive antenna element group are separate antenna element groups.

In addition, the transmit antenna element group may be configured to transmit a signal but not to receive a signal, and the receive antenna element group is configured to receive a signal but not to transmit a signal.

The first-type filter is configured to perform filtering on a signal transmitted by the antenna system, and the second-type filter is configured to perform filtering on a signal received by the antenna system. The first-type filter and the second-type filter may also be referred to as a transmitted-signal filter and a received-signal filter respectively.

In this application, the transmit antenna element group and the receive antenna element group are separately disposed, and the transmit antenna element group and the receive antenna element group are connected to the TRX unit by using respective corresponding filters, so that a transmitted signal can be isolated from a received signal. This can reduce interference between a PIM signal generated from the signal transmitted by the antenna system and the signal received by the antenna system, and improve quality of the received signal.

In some implementations of the first aspect, the radiation array specifically includes M columns of transmit antenna element groups and N columns of receive antenna element groups. In the M columns of transmit antenna element groups and the N columns of receive antenna element groups, a column spacing between any two columns of adjacent antenna element groups is greater than 0. Both M and N are integers greater than 1.

Because the transmit antenna element groups and the receive antenna element groups in the radiation array are separately arranged in columns, a transmit antenna element group column (a column in which the transmit antenna element groups are located) does not include a receive antenna element group, and a receive antenna element group column (a column in which the receive antenna element groups are located) does not include a transmit antenna element group. Therefore, beamforming can be performed more conveniently, so as to facilitate signal transmission and reception.

It should be understood that each column of transmit antenna element groups include a plurality of transmit antenna element groups, and each column of receive antenna element groups include a plurality of receive antenna element groups. An antenna element group herein may be a transmit antenna element group or a receive antenna element group.

Because a column spacing between different columns of antenna element groups is greater than 0, the transmit antenna element group and the receive antenna element group can be physically isolated, and interference between a PIM signal and a received signal can be reduced as much as possible.

Optionally, each column of transmit antenna element groups in the M columns of transmit antenna element groups include K transmit antenna element groups, and each column of receive antenna element groups in the N columns of receive antenna element groups include I receive antenna element groups.

Values of M and N may be the same or different. Similarly, values of K and I may be the same or different.

It should be understood that, when each column of transmit antenna element groups includes K transmit antenna element groups, and each column of receive antenna element groups includes I receive antenna element groups, the filter bank includes K*M first-type filters and I*N second-type filters, and the TRX unit includes K*M transmit modules and I*N receive modules.

Specifically, in the M columns of transmit antenna element groups, each column of transmit antenna element groups needs to be connected to K transmit modules of the TRX unit by using K first-type filters. Similarly, in the N columns of receive antenna element groups, each column of receive antenna element groups needs to be connected to I receive modules of the TRX unit by using I second-type filters.

Optionally, the M columns of transmit antenna element groups are located in a first area of the radiation array, and the N columns of receive antenna element groups are located in a second area of the array. The first area and the second area are located on two sides of the radiation array respectively.

It should be understood that the first area and the second area may be two areas that are located on a surface of the radiation array and that do not overlap with each other. Further, the first area and the second area may be two adjacent areas. For example, the M columns of transmit antenna element groups and the N columns of receive antenna element groups are located on a left side and a right side of the radiation array respectively.

For example, the radiation array includes eight columns of antenna element groups, and the column numbers are 1 to 8 in sequence. Columns 1 to 4 are transmit antenna element groups, and columns 5 to 8 are receive antenna element groups. Alternatively, columns 1 to 4 are receive antenna element groups, and columns 5 to 8 are transmit antenna element groups.

In some implementations of the first aspect, the M columns of transmit antenna element groups and the N columns of receive antenna element groups are interleaved in the radiation array.

Optionally, receive antenna element groups may be adjacent to at least two transmit antenna element groups in the M columns of transmit antenna element groups, and/or transmit antenna element groups may be adjacent to at least two receive antenna element groups in the N columns of receive antenna element groups.

For example, column 1 and column 2 in the radiation array are transmit antenna element groups, column 3 and column 4 in the radiation array are receive antenna element groups, and column 5 and column 6 are transmit antenna element groups. In this way, transmit antenna element groups and receive antenna element groups are alternately arranged, until all transmit antenna element groups and receive antenna element groups are arranged.

For example, in the radiation array, column 1 is transmit antenna element groups, column 2 and column 3 are receive antenna element groups, and column 4 is transmit antenna element groups. In this way, transmit antenna element groups and receive antenna element groups are alternately arranged.

By arranging transmit antenna element groups and receive antenna element groups in an interleaved manner, the antenna system can use an area of a reflector as large as possible to transmit or receive a signal, while transmitted signals and received signals are isolated.

In some implementations of the first aspect, M=N, and the M columns of transmit antenna element groups and the N columns of receive antenna element groups are interleaved in the radiation array in a ratio of 1:1.

Optionally, M=N, and the M columns of transmit antenna element groups and the N columns of receive antenna element groups form M+N columns of antenna element groups. Columns 1, 3, . . . , M+N−1 are transmit antenna element groups, and columns 2, 4, . . . , M+N are receive antenna element groups. Alternatively, columns 1, 3, . . . , M+N−1 are receive antenna element groups, and columns 2, 4, . . . , M+N are transmit antenna element groups.

For example, in the radiation array, column 1 is transmit antenna element groups, column 2 is receive antenna element groups, and column 3 is transmit antenna element groups. In this way, transmit antenna element groups and receive antenna element groups are alternately arranged until the last column (the last column is receive antenna element groups).

Alternatively, in the radiation array, column 1 is receive antenna element groups, column 2 is transmit antenna element groups, and column 3 is receive antenna element groups. In this way, transmit antenna element groups and receive antenna element groups are alternately arranged until the last column (the last column is transmit antenna element groups).

When the transmit antenna element groups and the receive antenna element groups in the radiation array are arranged in a ratio of 1:1, the antenna system can use almost all area of a reflector to transmit a signal or receive a signal, while transmitted signals and received signals are isolated. This can improve signal strength of the transmitted signal or the received signal.

In some implementations of the first aspect, a distance between any two adjacent antenna element groups in the M columns of transmit antenna element groups and the N columns of receive antenna element groups is less than or equal to 0.5 L, where L is a center frequency wavelength of the antenna system.

Optionally, a distance between any two adjacent antenna element groups in the M columns of transmit antenna element groups and the N columns of receive antenna element groups is less than or equal to 0.3 L.

By setting a distance between any two antenna element groups properly, the volume of a radiation array can be kept within a specific range, to prevent the antenna system from occupying an excessively large space, and facilitate installation and deployment of the antenna system.

In some implementations of the first aspect, a feeding apparatus is integrated into the filter bank, and the filter bank is disposed on a surface of the radiation array. The transmit antenna element group and the receive antenna element group are respectively connected to the first-type filter and the second-type filter in the filter bank using the feeding apparatus.

The feeding apparatus is integrated into the filter bank, and the filter bank is disposed on the surface of the radiation array, so that it is more convenient to feed antenna element groups, and a connector is not needed. This greatly improves integration of the antenna system, and facilitates installation and maintenance of the antenna system.

Optionally, the feeding apparatus includes a plurality of feeding units. Each feeding unit is connected to a corresponding transmit antenna element group or a corresponding receive antenna element group, and is configured to feed the transmit antenna element group or the receive antenna element group.

For example, if each column of transmit antenna element groups in the M columns of transmit antenna element groups includes K transmit antenna element groups, and each column of receive antenna element groups in the N columns of receive antenna element groups includes I receive antenna element groups, the feeding apparatus includes M*K+N*I feeding units in total.

Optionally, the feeding apparatus includes dual-polarized slots.

Optionally, the feeding apparatus includes dual-polarized feeding pins.

It should be understood that the dual-polarized slots and the dual-polarized feeding pins are feeding units, and the feeding units together form the feeding apparatus.

In some implementations of the first aspect, any antenna element group in the M columns of transmit antenna element groups and the N columns of receive antenna element groups includes at least one radiation oscillator.

Optionally, the radiation oscillator is a +/−45-degree dual-polarized radiation oscillator.

The radiation oscillator may specifically include a microstrip antenna. The microstrip antenna is located on a thin dielectric substrate. On one side of the microstrip antenna, a thin metal layer is attached as a ground plate, and on the other side of the microstrip antenna, a metal patch of a specific shape is made using a photoetching method. A microstrip line or a coaxial probe is used to feed the patch, to form the antenna.

Optionally, any element group in the M columns of transmit antenna element groups includes two or three +/−45-degree dual-polarized radiation oscillators.

Optionally, the radiation oscillator is any one of a dipole antenna, a patch antenna, and a dielectric resonator antenna.

In some implementations of the first aspect, the first-type filter and the second-type filter are metal filters or dielectric filters.

In some implementations of the first aspect, the antenna system further includes a reflector.

A signal transmitted by the transmit antenna element group may be constrained to a specific direction by the reflector, so that directivity of a transmitted signal is improved and mutual interference between different transmitted signals can be avoided.

In some implementations of the first aspect, the filter banks are an integrated filter array.

By integrating the filter banks to form a filter array, integration of filters can be reduced, and the volume of the filter banks can be reduced.

Optionally, the filter banks may further be integrated with a power splitter, to further reduce the volume of the antenna system.

It should be understood that, that the filter banks are integrated means that the first-type filter is integrated with the second-type filter. The first-type filter may be integrated with the second-type filter based on positions that correspond to corresponding antenna element groups in the radiation array.

In some implementations of the first aspect, the antenna system is disposed in a frequency division duplex (FDD) system.

In other words, the antenna system in this application may be an antenna system in the FDD system. Further, the antenna system in this application may be a multi-input and multi-output (MIMO) antenna system in the FDD system.

According to a second aspect, a base station is provided. The base station includes the antenna system in the first aspect or any one of the implementations of the first aspect and a radio frequency module. The radio frequency module is connected to the antenna system.

DESCRIPTION OF EMBODIMENTS

The following describes technical solutions of this application with reference to the accompanying drawings.

In a conventional antenna system, an antenna array of the antenna system is not only configured to transmit a signal to the outside, but also configured to receive a signal from the outside of the antenna system. However, signals transmitted by the antenna system in different frequency bands generate a PIM signal, and the PIM signal causes relatively large interference with signals received by the antenna system. Consequently, the quality of the received signals is relatively poor. A main reason for this phenomenon is that the antenna array in the conventional antenna system is multiplexed (because of the need to transmit and receive signals). As a result, the PIM signal that is generated in different transmit frequency bands and the signal received by the antenna system pass through a same physical channel. Consequently, the PIM signal interferes with the signal received by the antenna system. Therefore, to reduce the interference between the PIM signal and a received signal, a transmit antenna element group configured to transmit signals and a receive antenna element group configured to receive signals may be separately disposed in the antenna system, and the transmit antenna element group and the receive antenna element group are connected to a TRX unit using different filters respectively. In this way, the physical channel for transmitting signals is completely isolated from the physical channel for receiving signals, so that the interference between the PIM signal and the received signal is reduced or eliminated as much as possible.

The following describes in detail different embodiments of an antenna system with reference to FIG. 1 to FIG. 4.

Figure 1:
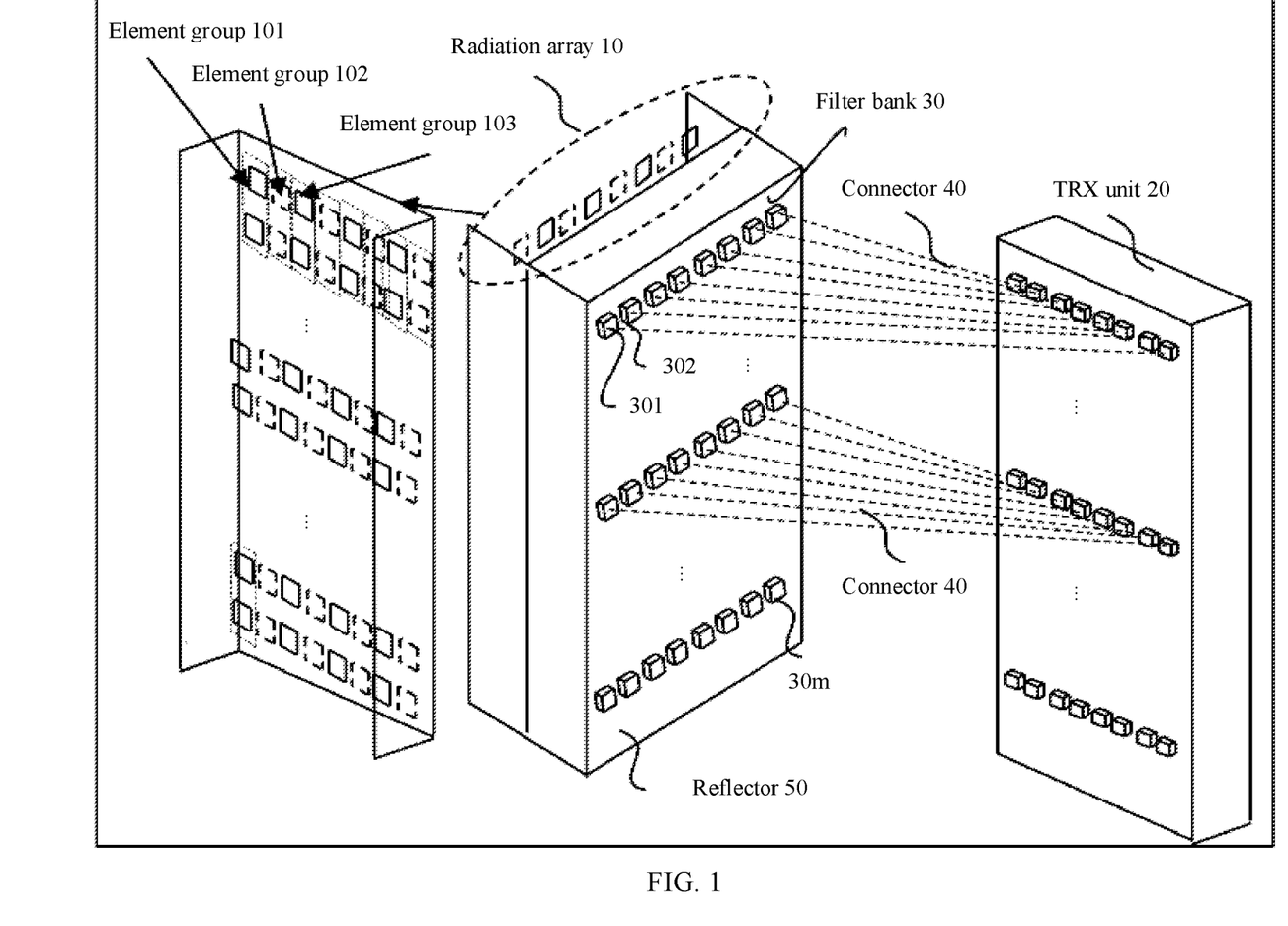
FIG. 1 is a schematic diagram of an antenna system according to an embodiment of this application.

FIG. 1 is a schematic diagram of an antenna system according to an embodiment of this application. The antenna system shown in FIG. 1 includes a radiation array 10, a TRX unit 20, and a filter bank 30.

As shown in the leftmost figure in FIG. 1, the radiation array 10 includes a plurality of antenna element groups such as an antenna element group 101, an antenna element group 102, and an antenna element group 103. The antenna element group 101, the antenna element group 102, the antenna element group 103, and the like each include an upper radiation oscillator and a lower radiation oscillator (each rectangular unit in the leftmost figure in FIG. 1 represents one radiation oscillator).

It should be understood that FIG. 1 shows only a case in which the antenna element group 101, the antenna element group 102, the antenna element group 103, and the like in the radiation array each include the same quantity of radiation oscillators. Alternatively, the quantities of radiation oscillators included in the antenna element groups in the radiation array may be different.

In addition, the antenna element groups (including the antenna element group 101, the antenna element group 102, the antenna element group 103, . . . ) in the radiation array 10 may be classified into a transmit antenna element group and a receive antenna element group. The transmit antenna element group is configured to transmit a signal to the outside, and the receive antenna element group is configured to receive a signal from the outside, that is, the radiation array 10 includes a transmit antenna element group and a receive antenna element group, and the transmit antenna element group and the receive antenna element group are separately disposed in the radiation array. It should be understood that, that the transmit antenna element group and the receive antenna element group are separately disposed in the radiation array means that the transmit antenna element group and the receive antenna element group are separate antenna element groups, not multiplexed antenna element groups (the multiplexed antenna element groups not only transmit a signal, but also receive a signal).

The TRX unit 20 includes a transmit module and a receive module. As shown in the rightmost figure in FIG. 1, each rectangular block on the surface of the TRX unit represents one transmit module or one receive module (the transmit module and the receive module are not specifically marked in FIG. 1).

In addition, in FIG. 1, the filter bank 30 includes a first-type filter and a second-type filter (a filter 301 to a filter 30m, where m represents the quantity of filters included in the filter bank 30). The first-type filter connects between the transmit antenna element group in the radiation array 10 and the transmit module of the TRX unit, and the second-type filter connects between the receive antenna element group in the radiation array 10 and the receive module of the TRX unit 20.

The first-type filter (which may also be referred to as a transmitted-signal filter) is configured to perform filtering on a signal transmitted by the antenna system, and the second-type filter (which may also be referred to as a received-signal filter) is configured to perform filtering on a signal received by the antenna system. Through filtering, a signal in a frequency band that is not desired can be filtered out, and only signals in a desired frequency band is retained. In addition, the first-type filter and the second-type filter may correspond to different frequency bands, and frequencies filtered out by the first-type filter and the second-type filter can also be different.

In this application, the transmit antenna element group and the receive antenna element group are separately disposed, and the transmit antenna element group and the receive antenna element group are respectively connected to the TRX unit via corresponding filters, so that a transmitted signal can be isolated from a received signal. This can reduce interference caused by a PIM signal generated by the transmitted signal interfering with the signal received by the antenna system, and improve quality of the received signal.

Optionally, the antenna system in this application may be disposed in a frequency division duplex (FDD) system. In other words, the antenna system in this application may be an antenna system in the FDD system. Further, the antenna system in this application may be a multi-input and multi-output (MIMO) antenna system in the FDD system.

Optionally, transmit antenna element groups and receive antenna element groups in the radiation array may be arranged into an antenna element group array.

By arranging antenna element groups into an array, beamforming (BF) can be better performed.

Optionally, in an embodiment, the radiation array includes M columns of transmit antenna element groups and N columns of receive antenna element groups. A column spacing between any two columns of adjacent antenna element groups in the M columns of transmit antenna element groups and the N columns of receive antenna element groups is greater than 0. Both M and N are integers greater than 1.

It should be understood that each column of transmit antenna element groups may include a plurality of transmit antenna groups, and each column of receive antenna element groups may include a plurality of receive antenna element groups. An antenna element group in this application may be a transmit antenna element group or a receive antenna element group.

Because a column spacing between different columns of antenna element groups is greater than 0, the transmit antenna element group and the receive antenna element group are physically isolated, and interference between a PIM signal to a received signal can be reduced as much as possible.

Specifically, as shown in FIG. 1, antenna element groups located in a same vertical direction may form one column of antenna element groups (which may also be referred to as an antenna element group column). Transmit antenna element groups located in a same vertical direction form a transmit antenna element group column, and receive antenna element groups located in a same vertical direction form a receive antenna element group column (the transmit antenna element group column and the receive antenna element group column are not specifically marked in FIG. 1, and the transmit antenna element group column and the receive antenna element group column may be randomly arranged in the radiation array).

It should be understood that a column spacing between two columns of antenna element groups may be a spacing between two adjacent boundary lines of the two columns of antenna element groups. That a column spacing between any two columns of adjacent antenna element groups is greater than 0 may mean that any two columns of antenna element groups do not overlap or cover each other.

Optionally, each column of transmit antenna element groups in the M columns of transmit antenna element groups includes K transmit antenna element groups, and each column of receive antenna element groups in the N columns of receive antenna element groups includes I receive antenna element groups.

It should be understood that the values of M and N may be the same or different, and the value of K and the value of I may be the same or different.

It should be understood that, when each column of transmit antenna element groups includes the K transmit antenna element groups and each column of receive antenna element groups includes the I receive antenna element groups, the filter bank includes K*M first-type filters and I*N second-type filters, and the TRX unit includes K*M transmit modules and I*N receive modules.

Specifically, in the M columns of transmit antenna element groups, each column of transmit antenna element groups need to be connected to K transmit modules of the TRX unit via K first-type filters.

Similarly, in the N columns of receive antenna element groups, each column of receive antenna element groups need to be connected to K receive modules of the TRX unit via I second-type filters.

For example, as shown in FIG. 1, each column of antenna element groups includes three antenna element groups, and correspondingly, each column of antenna element groups are connected to three transmit modules or receive modules of the TRX unit via three filters.

As shown in FIG. 1, the radiation array 10 and the filter bank 30 may be integrated into a reflector 50. In addition, the radiation array 10 and the filter bank 30 may be located on two sides of the reflector 50. To facilitate viewing of the structure of the radiation array 10, a stretch-out view of the radiation array 10 is provided on the leftmost side of FIG. 1.

It should be understood that, when the radiation array 10 includes M columns of transmit antenna element groups and N columns of receive antenna element groups, the M columns of transmit antenna element groups and the N columns of receive antenna element groups may be separately arranged or interleaved in the radiation array 10.

Optionally, the M columns of transmit antenna element groups are located in a first area of the radiation array, and the N columns of receive antenna element groups are located in a second area of the array. The first area and the second area are located on two sides of the radiation array 10 respectively.

It should be understood that the first area and the second area may be two areas that are located on a surface of the radiation array and do not overlap with each other. Further, the first area and the second area may be two adjacent areas. For example, the M columns of transmit antenna element groups and the N columns of receive antenna element groups are located on the left side and the right side of the radiation array 10 respectively.

For example, the radiation array 10 includes eight columns of antenna element groups in total, and column numbers are 1 to 8 in sequence. Columns 1 to 4 are transmit antenna element groups, and columns 5 to 8 are receive antenna element groups. Alternatively, columns 1 to 4 are receive antenna element groups, and columns 5 to 8 are transmit antenna element groups. In this case, the M columns of transmit antenna element groups and the N columns of receive antenna element groups are separately arranged in the radiation array 10.

Optionally, in an embodiment, the M columns of transmit antenna element groups and the N columns of receive antenna element groups are interleaved in the radiation array 10.

It should be understood that, that the M columns of transmit antenna element groups and the N columns of receive antenna element groups are interleaved in the radiation array may mean that receive antenna element groups are adjacent to antenna element groups of at least two transmit antenna element groups in the M columns of transmit antenna element groups, and/or transmit antenna element groups are adjacent to antenna element groups of at least two receive antenna element groups in the N columns of receive antenna element groups.

For example, in the radiation array 10, column 1 and column 2 in the radiation array are transmit antenna element groups, column 3 and column 4 in the radiation array are receive antenna element groups, and column 5 and column 6 are transmit antenna element groups. In this way, transmit antenna element groups and receive antenna element groups are alternately arranged, until all transmit antenna element groups and receive antenna element groups are arranged.

For another example, in the radiation array 10, column 1 is transmit antenna element groups, column 2 and column 3 are receive antenna element groups, and column 4 is transmit antenna element groups. In this way, transmit antenna element groups and receive antenna element groups are alternately arranged.

By arranging transmit antenna element groups and receive antenna element groups in an interleaved manner, the antenna system can utilize an area of a reflector as large as possible to transmit or receive a signal, while transmitted signals and received signals remain isolated.

Figure 2:
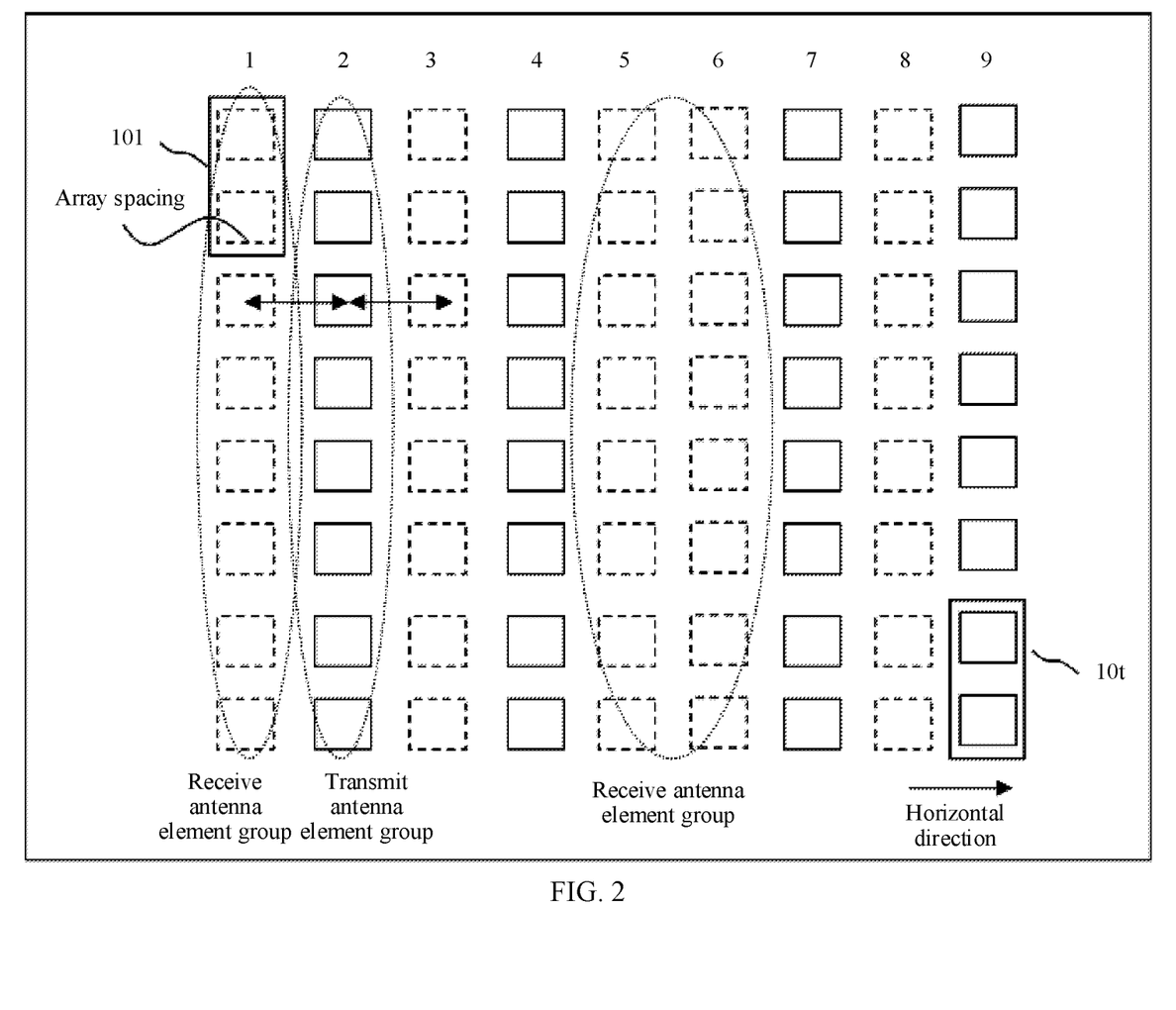
FIG. 2 is a schematic diagram of an antenna system according to an embodiment of this application.

For example, as shown in FIG. 2, the radiation array includes nine columns of antenna element groups, and column numbers are 1 to 9 in sequence. Columns 1, 3, 5, 6, and 8 are receive antenna element groups, and columns 2, 4, 7, and 9 are transmit antenna element groups. The transmit antenna element groups and the receive antenna element groups are interleaved in the radiation array. In the first four columns in the radiation array, the quantity of transmit antenna element groups is the same as the quantity of receive antenna element groups. The transmit antenna element groups and the receive antenna element groups are arranged in a ratio of 1:1. In the last five columns in the radiation array, the quantity of transmit antenna element groups is less than the quantity of receive antenna element groups. The transmit antenna element groups and the receive antenna element groups are not arranged in a ratio of 1:1.

Optionally, in an embodiment, M=N, and the M columns of transmit antenna element groups and the N columns of receive antenna element groups are interleaved in the radiation array in a ratio of 1:1.

It should be understood that when the transmit antenna element groups and the receive antenna element groups are arranged in a ratio of 1:1, M is equal to N, and the transmit antenna element group and the receive antenna element group are alternately arranged in the radiation array.

Specifically, M=N, and the M columns of transmit antenna element groups and the N columns of receive antenna element groups form M+N columns of antenna element groups. Columns 1, 3, . . . , M+N−1 are transmit antenna element groups, and columns 2, 4, . . . , M+N are receive antenna element groups. Alternatively, columns 1, 3, . . . , M+N−1 are receive antenna element groups, and columns 2, 4, . . . , M+N are transmit antenna element groups.

For example, in the radiation array, column 1 is transmit antenna element groups, column 2 is receive antenna element groups, and column 3 is transmit antenna element groups. In this way, transmit antenna element groups and receive antenna element groups are alternately arranged until the last column (the last column is receive antenna element groups).

Alternatively, in the radiation array, column 1 is receive antenna element groups, column 2 is transmit antenna element groups, and column 3 is receive antenna element groups. In this way, transmit antenna element groups and receive antenna element groups are alternately arranged until the last column (the last column is transmit antenna element groups).

When the transmit antenna element groups and the receive antenna element groups in the radiation array are arranged in a ratio of 1:1, the antenna system can use almost all area of a reflector to transmit or receive signals, while the transmitted signals and received signals remain isolated. This can improve the signal strength of the transmitted signal or the received signal.

Figure 3:
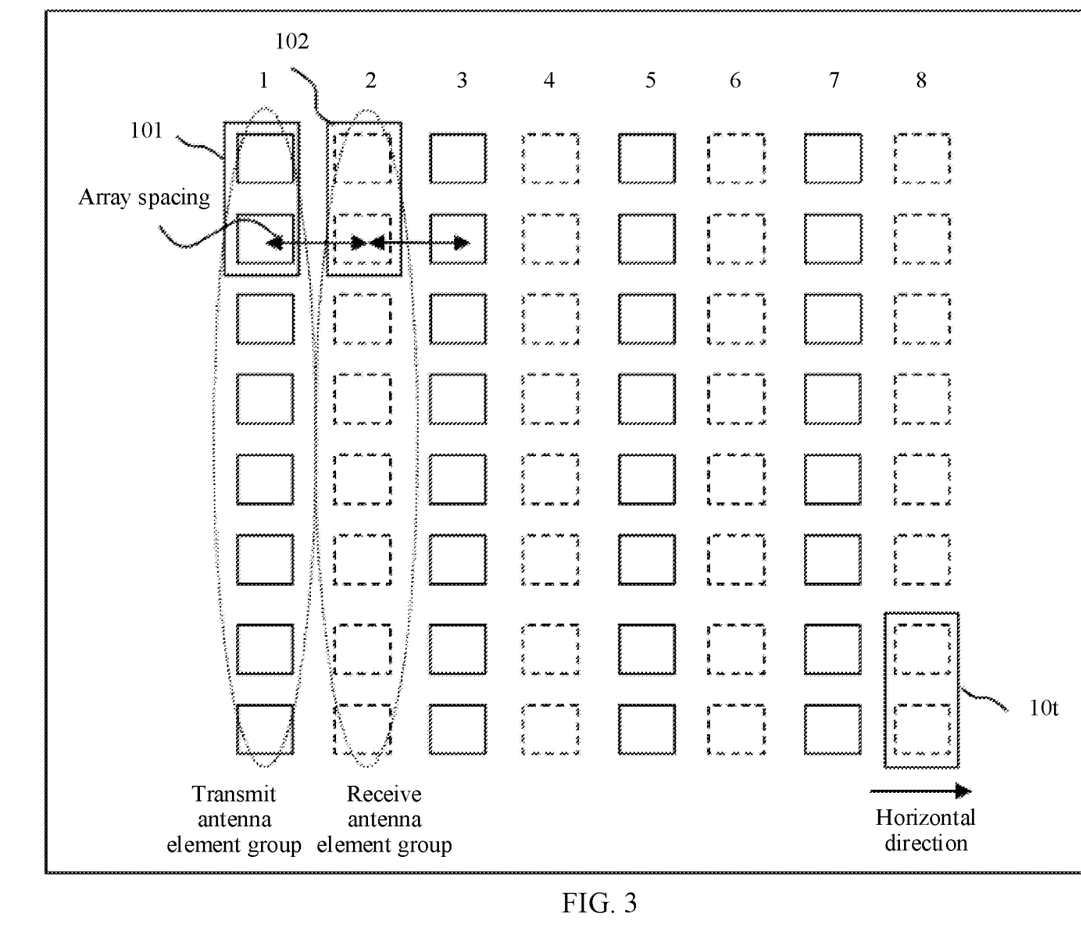
FIG. 3 is a schematic diagram of arrangement of antenna element groups in a radiation array according to an embodiment of this application.

For example, as shown in FIG. 3, the radiation array includes eight columns of antenna element groups, and the column numbers are 1 to 8 in sequence. Columns 1, 3, 5, and 7 are transmit antenna element group columns, and columns 2, 4, 6, and 8 are receive antenna element group columns. The transmit antenna element group columns and the receive antenna element group columns are interleaved in the radiation array in a ratio of 1:1. That is, in FIG. 3, both sides of each transmit antenna element group (except a transmit antenna element group in the first column) are receive antenna element groups, and both sides of each receive antenna element group (except a receive antenna element group in the last column) are transmit antenna element groups.

Optionally, the antenna system further includes a connector, where the connector is configured to connect the filter bank and the TRX unit.

As shown in FIG. 1, the antenna system in this embodiment of this application further includes a connector 40. The connector 40 is configured to connect the filter bank 30 and the TRX unit 20.

Specifically, each filter in the filter bank 30 is connected to the transmit module or the receive module of the TRX unit 20 through the connector 40.

Optionally, in an embodiment, a distance between any two adjacent antenna element groups in the M columns of transmit antenna element groups and the N columns of receive antenna element groups is less than or equal to 0.5 L, where L is the wavelength corresponding to the center frequency of an operating frequency range of the antenna system.

Further, a distance between any two adjacent antenna element groups in the radiation array may be less than or equal to 0.4 L, or a distance between any two adjacent antenna element groups in the radiation array may be less than or equal to 0.3 L.

By properly setting a spacing between adjacent antenna element groups, integration of the radiation array can be improved, so as to reduce the space occupied by the antenna system and facilitate installation and deployment of the antenna system.

Optionally, the filter bank 30 is an integrated filter array.

In this application, by integrating the filters, integration of the filter bank can be improved, so as to reduce the space occupied by the antenna system and facilitate installation of the antenna system.

Optionally, the filter bank may further be integrated with a power splitter, to further reduce the size of the antenna system.

It should be understood that, filter bank integration means that the first-type filter is integrated with the second-type filter. The first-type filter may be integrated with the second-type filter based on positions that correspond to corresponding antenna element groups in the radiation array.

Specifically, the filter bank 30 includes M*K first-type filters and N*I second-type filters, and the M*K first-type filters are integrated with the N*I second-type filters to form a filter array. K is the quantity of transmit antenna element groups included in each column of transmit antenna element groups, and I is the quantity of receive antenna element groups included in each column of receive antenna element groups.

Figure 4:
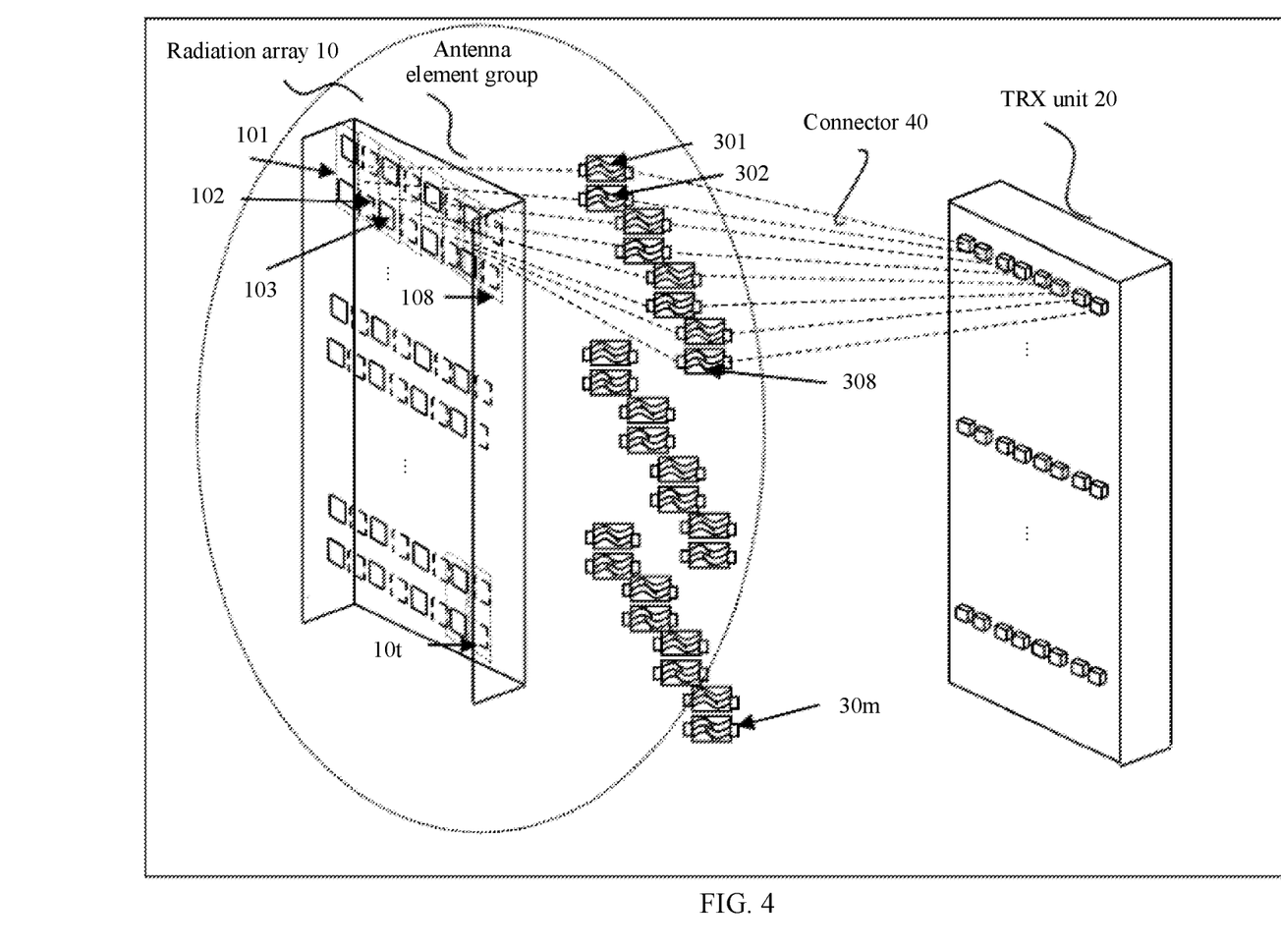
FIG. 4 is a schematic diagram of arrangement of antenna element groups in a radiation array according to an embodiment of this application.

FIG. 4 shows a connection relationship between a radiation array and a TRX unit. As shown in FIG. 4, each antenna element group in the radiation array is connected to the TRX unit by using one filter. Specifically, a transmit antenna element group in the radiation array is connected to a transmit module of the TRX unit by using a first-type filter, and a receive antenna element group in the radiation array is connected to a receive module of the TRX unit by using a second-type filter.

As shown in FIG. 4, each antenna element group (which may be a transmit antenna element group or a receive antenna element group) is connected to the transmit module or the receive module of the TRX unit by using one independent filter, thereby isolating transmitted signals from received signals. The interference caused by a PIM signal interfering with the received signal can be reduced or eliminated as much as possible.

Optionally, in an embodiment, a feeding apparatus is integrated into a filter bank, the filter bank is disposed on a surface of the radiation array, and the transmit antenna element group and the receive antenna element group are respectively connected to the first-type filter and the second-type filter in the filter bank via the feeding apparatus.

The feeding apparatus is integrated into the filter bank, and the filter bank is disposed on the surface of the radiation array, so that antenna element groups can be fed more conveniently, without the need of a connector. This greatly improves integration of the antenna system, and facilitates installation and maintenance of the antenna system.

Optionally, the feeding apparatus includes a plurality of feeding units. Each feeding unit is connected to a corresponding transmit antenna element group or a receive antenna element group, and is configured to feed the transmit antenna element group or the receive antenna element group.

For example, if each column of transmit antenna element groups in the M columns of transmit antenna element groups includes K transmit antenna element groups, and each column of receive antenna element groups in the N columns of receive antenna element groups includes I receive antenna element groups, the feeding apparatus includes M*K+N*I feeding units in total.

Optionally, the feeding apparatus may include dual-polarized slots or dual-polarized feeding pins.

It should be understood that both the dual-polarized slots and the dual-polarized feeding pins are feeding units, and the feeding units together form the feeding apparatus.

Figure 5:
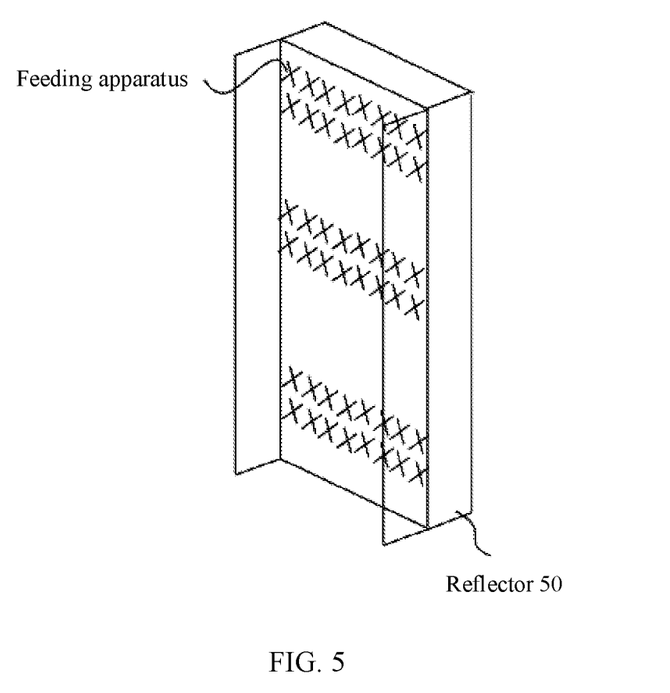
FIG. 5 is a schematic diagram of arrangement of a feeding apparatus according to an embodiment of this application.

FIG. 5 shows a feeding apparatus that includes dual-polarized slots. One side of each dual-polarized slot is connected to a first-type filter or a second-type filter in a filter bank, and the other side is connected to one transmit antenna element group or one receive antenna element group. The dual-polarized slots are configured to feed the connected transmit antenna element group or the connected receive antenna element group.

Figure 6:
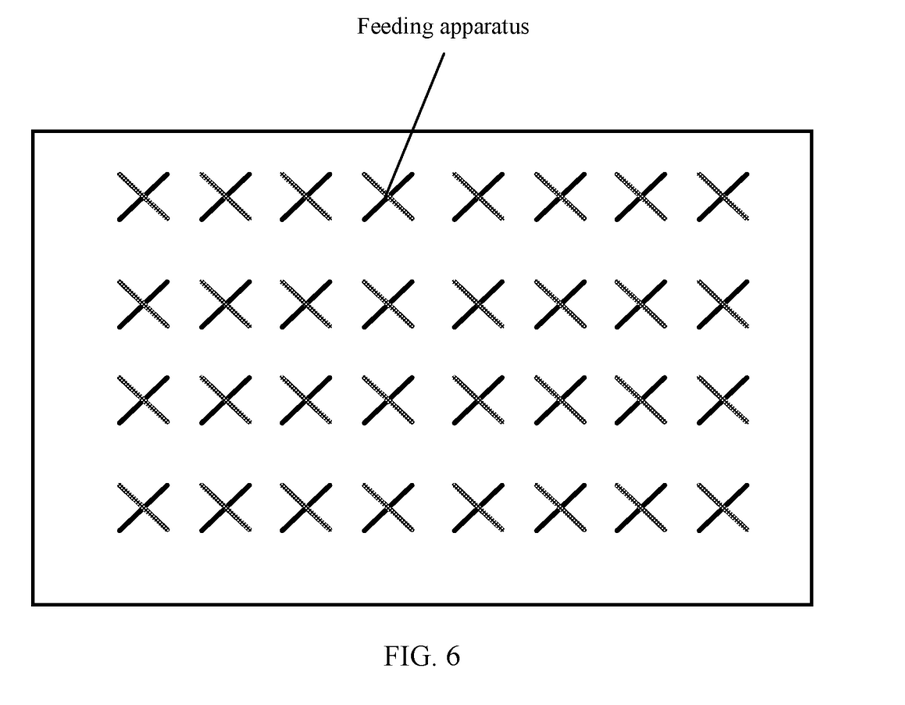
FIG. 6 is a schematic diagram of arrangement of a feeding apparatus including dual-polarized slots according to an embodiment of this application.

FIG. 6 is a schematic plane diagram of a feeding apparatus that includes dual-polarized slots. As shown in FIG. 6, the dual-polarized slots are arranged in an array form, and a spacing between the dual-polarized slots matches a spacing between antenna element groups in a radiation array. The dual-polarized slots are in a one-to-one correspondence with the antenna element groups in the radiation array. After the feeding apparatus is integrated with the radiation array, each dual-polarized slot feeds a corresponding antenna element group.

Figure 7:
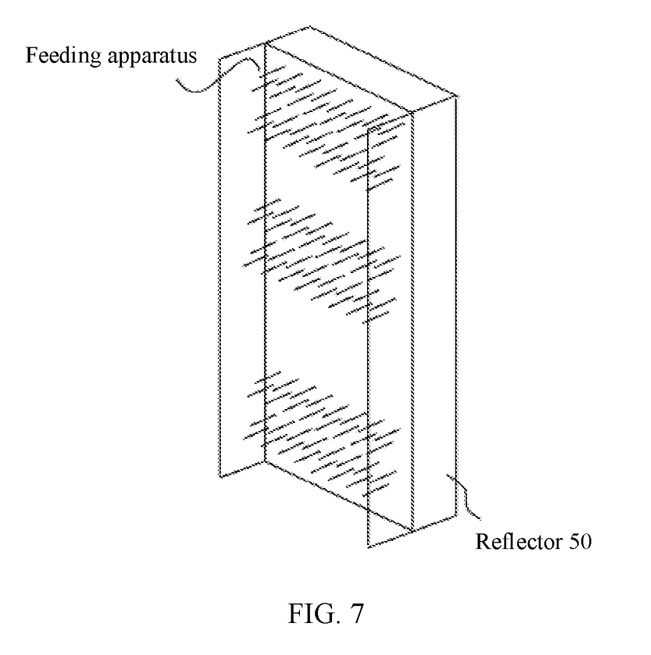
FIG. 7 is a schematic diagram of a feeding apparatus including dual-polarized feeding pins according to an embodiment of this application.

FIG. 7 shows a feeding apparatus that includes dual-polarized feeding pins. One end of each dual-polarized feeding pin is connected to a first-type filter or a second-type filter, and the other end is connected to one transmit antenna element group or one receive antenna element group. The dual-polarized feeding pins are configured to feed the connected transmit antenna element group or the connected receive antenna element group.

Further, the foregoing feeding apparatus may be integrated into a port of a filter. In this way, a connection line required for connecting the filter and the feeding apparatus when the feeding apparatus is independently disposed can be avoided, integration of the feeding apparatus can be improved, and the space occupied by an antenna system can be reduced. Because the connection line between the filter and the feeding apparatus is reduced, the complexity of antenna system maintenance can be reduced.

Figure 8:
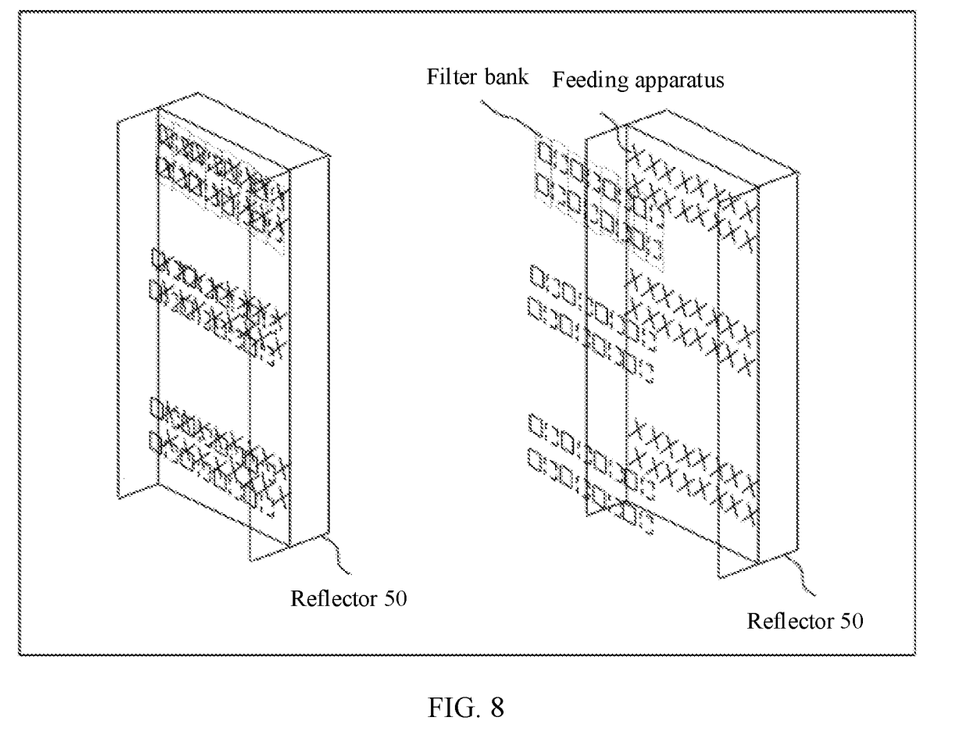
FIG. 8 is a schematic diagram of integration of a filter bank and a feeding apparatus.

FIG. 8 is a schematic diagram showing the integration of a feeding apparatus and filters. The left side of FIG. 8 is a structural diagram showing integration of the feeding apparatus and a filter bank. A radiation array and the filter bank are integrated and disposed on a reflector. The right side of FIG. 8 is an exploded view showing an internal design of how to integrate the feeding apparatus and the filter bank. Each filter in the filter bank corresponds to one feeding unit (the feeding units in FIG. 8 are dual-polarized feeding pins) in the feeding apparatus.

In FIG. 8, by integrating the feeding apparatus into the filter, integration of an antenna system can be improved, and the size of the antenna system can be reduced.

Optionally, in an embodiment, any antenna element group in M columns of transmit antenna element groups and N columns of receive antenna element groups includes at least one radiation oscillator.

The radiation oscillator is a +/−45-degree dual-polarized radiation oscillator.

Optionally, any antenna element group (a transmit antenna element group or a receive antenna element group) in the radiation array includes two or three +/−45-degree dual-polarized radiation oscillators.

Optionally, the radiation oscillator is any one of a dipole antenna, a patch antenna, and a dielectric resonator antenna.

Optionally, in an embodiment, the first-type filter and the second-type filter are metal filters or dielectric filters.

When the first-type filter and the second-type filter are metal filters, surfaces of the first-type filter and the second-type filter may be used as reflectors, to improve the signal reception or transmission by the antenna system.

Optionally, in an embodiment, the antenna system further includes a reflector.

Signals transmitted by the transmit antenna element group may be constrained to a specific direction using the reflector, so that the directivity of a transmitted signal is improved and interference between different transmitted signals can be minimized.

The antenna system in the embodiments of this application may be used in a network device, and may be configured to receive and transmit signals. Specifically, the antenna system in the embodiments of this application may be used in a base station.

Figure 9:
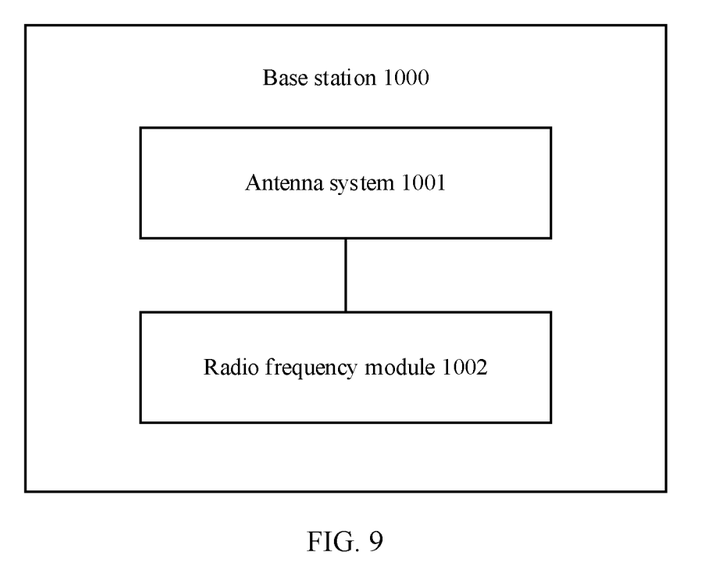
FIG. 9 is a schematic block diagram of a base station according to an embodiment of this application.

FIG. 9 is a schematic block diagram of a base station according to an embodiment of this application. A base station 1000 shown in FIG. 9 includes an antenna system 1001 and a radio frequency module 1002, where the antenna system 1001 is connected to the radio frequency module 1002. The radio frequency module 1002 is configured to convert a baseband signal into a high-frequency current (radio frequency signal), and transmit the radio frequency signal in the form of an electromagnetic wave using a radiation oscillator in the antenna system. In addition, the radio frequency module 1002 may further convert a high-frequency current (the radiation unit converts a received electromagnetic wave signal into a high-frequency current signal) transmitted by the radiation unit in the antenna system into a baseband signal.

It should be understood that the antenna system 1001 may be the antenna system in FIG. 1 to FIG. 8. Through the antenna system 1001, the base station can transmit information to and exchange information with a terminal device.

A person skilled in the art may clearly understand that, for the purpose of convenient and brief description, for detailed working processes of the foregoing system, apparatus, and unit, refer to corresponding processes in the foregoing embodiments, and details are not described herein again.

In the several embodiments provided in this application, it should be understood that the disclosed system, apparatus, and method may be implemented in other manners. For example, the described apparatus embodiments are merely examples. For example, division into units is merely logical function division and there may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna system, comprising:
   a radiation array, comprising a support upon which a transmit antenna element group and a receive antenna element group are separately disposed, wherein the transmit antenna element group is configured to transmit a first signal, and the receive antenna element group is configured to receive a second signal;
   a transmit module and a receive module; and
   a filter bank, comprising a housing having a first-type filter and a second-type filter, wherein the first-type filter is connected in between the transmit antenna element group and the transmit module, and the second-type filter is connected in between the receive antenna element group and the receive module, wherein the housing is disposed between the filters of the filter bank and radiation array.

2. The antenna system according to claim 1, wherein the radiation array comprises M columns of transmit antenna element groups and N columns of receive antenna element groups, and a column spacing between any two columns of adjacent antenna element groups is greater than 0, wherein both M and N are integers greater than 1.

3. The antenna system according to claim 2, wherein the two columns of adjacent antenna element groups comprise one column of transmit antenna element group and one column of receive antenna element group.

4. The antenna system according to claim 2, wherein the column spacing between any two columns of adjacent antenna element groups is less than or equal to 0.5 L, wherein L is a center frequency wavelength of the antenna system.

5. The antenna system according to claim 2, wherein the M columns of transmit antenna element groups and the N columns of receive antenna element groups are interleaved in the radiation array, and both M and N are integers greater than 1.

6. The antenna system according to claim 5, wherein M=N, and the M columns of transmit antenna element groups and the N columns of receive antenna element groups are interleaved in the radiation array in a ratio of 1:1.

7. The antenna system according to claim 1, wherein a feeding apparatus is integrated into the filter bank, and the filter bank housing is disposed on a surface of the radiation array; and the transmit antenna element group and the receive antenna element group are respectively connected to the first-type filter and the second-type filter in the filter bank via the feeding apparatus.

8. The antenna system according to claim 7, wherein the feeding apparatus comprises dual-polarized slots or dual-polarized feeding pins.

9. The antenna system according to claim 1, wherein the filter bank comprises an integrated filter array.

10. The antenna system according to claim 1, wherein the transmit antenna element group and the receive antenna element group each comprise at least one radiation oscillator.

11. The antenna system according to claim 10, wherein the at least one radiation oscillator is any one of a dipole antenna, a patch antenna, and a dielectric resonator antenna.

12. The antenna system according to claim 1, wherein the first-type filter and the second-type filter are metal filters or dielectric filters.

13. The antenna system according to claim 1, wherein the antenna system is disposed in a frequency division duplex (FDD) system.

14. A base station, comprising the antenna system according to claim 1 and a radio frequency module connected to the antenna system.

15. A base station comprising:
 a radio frequency module configured to convert a baseband signal into a radio frequency signal; and
 an antenna system in communication with the radio frequency module and configured to receive the radio frequency signal therefrom, the antenna system comprising
 a radiation array, comprising a support upon which M columns of transmit antenna element groups and N columns of receive antenna element groups are separately disposed, wherein both M and N are integers greater than 1,
 a transmit module for each transmit antenna element group of the M columns of transmit antenna element groups and a receive module for each receive antenna element group of the N columns of receive antenna element groups, and
 a filter bank, comprising a housing and having a first plurality of first-type filters and a second plurality of second-type filters, wherein one of the first plurality of first-type filters is connected between each transmit antenna element group and a corresponding transmit module, and one of the second plurality of second-type filters is connected between each receive antenna element group and a corresponding receive module, and wherein the antenna system further comprises a reflector integrated with the filter bank.

16. The base station according to claim 15 wherein the radiation array and the filter bank are located on two sides of the reflector.

17. The base station according to claim 15 further comprising a feeding apparatus integrated into the filter bank.

18. The base station according to claim 17, wherein the filter bank housing is disposed on a surface of the radiation array.

19. The base station according to claim 15 wherein the transmit antenna element groups and the receive antenna element groups are alternately arranged.

* * * * *